(12) United States Patent
Slezak

(10) Patent No.: US 12,531,248 B2
(45) Date of Patent: *Jan. 20, 2026

(54) SINGLE-WALLED CARBON NANOTUBES IN ALKALINE ELECTROCHEMICAL CELL ELECTRODES

(71) Applicant: Energizer Brands, LLC, St. Louis, MO (US)

(72) Inventor: Philip J. Slezak, North Ridgeville, OH (US)

(73) Assignee: Energizer Brands, LLC, St. Louis, MO (US)

( * ) Notice: Subject to any disclaimer, the term of this patent is extended or adjusted under 35 U.S.C. 154(b) by 84 days.

This patent is subject to a terminal disclaimer.

(21) Appl. No.: 18/047,793

(22) Filed: Oct. 19, 2022

(65) Prior Publication Data

US 2023/0335744 A1   Oct. 19, 2023

Related U.S. Application Data

(63) Continuation of application No. 16/547,990, filed on Aug. 22, 2019, now Pat. No. 11,502,303.

(60) Provisional application No. 62/721,245, filed on Aug. 22, 2018.

(51) Int. Cl.
| | |
|---|---|
| *H01M 4/62* | (2006.01) |
| *H01M 4/02* | (2006.01) |
| *H01M 4/24* | (2006.01) |
| *H01M 4/48* | (2010.01) |
| *H01M 4/50* | (2010.01) |
| *H01M 4/52* | (2010.01) |
| *H01M 6/04* | (2006.01) |
| *H01M 10/26* | (2006.01) |

(52) U.S. Cl.
CPC ............. *H01M 4/625* (2013.01); *H01M 4/24* (2013.01); *H01M 4/48* (2013.01); *H01M 10/26* (2013.01); *H01M 2004/028* (2013.01); *H01M 4/50* (2013.01); *H01M 4/52* (2013.01); *H01M 6/045* (2013.01); *H01M 2300/0014* (2013.01)

(58) Field of Classification Search
CPC .......... H01M 4/625; H01M 4/48; H01M 4/24; H01M 4/52; H01M 4/50; H01M 4/32; H01M 2004/028; H01M 6/045; H01M 10/26; H01N 2300/0014
See application file for complete search history.

(56) References Cited

U.S. PATENT DOCUMENTS

| | | |
|---|---|---|
| 4,863,817 A | 9/1989 | Ogino et al. |
| 5,482,798 A | 1/1996 | Mototani et al. |
| 6,589,693 B1 | 7/2003 | Kilby et al. |

(Continued)

OTHER PUBLICATIONS

Wang, Kai et al. "High-Performance Cable-Type Flexible Rechargeable Zn Battery Based On $MnO_2$@CNT Fiber Microelectrode," ACS Applied Materials & Interfaces, vol. 10, pp. 24573-24582, Jun. 29, 2018, DOI: 10.1021/acsami.8b07756.

*Primary Examiner* — Matthew W Van Oudenaren
(74) *Attorney, Agent, or Firm* — ALSTON & BIRD LLP

(57) ABSTRACT

Alkaline electrochemical cells are provided, wherein a conductive carbon is included in the cell's cathode in order to decrease resistivity of the cathode, so as to improve the discharge of the cell, particularly in high drain applications. The conductive carbon may comprise carbon nanotubes and/or graphene. Methods for preparing such cells are also provided.

14 Claims, 13 Drawing Sheets

(56) References Cited

U.S. PATENT DOCUMENTS

| | | |
|---|---|---|
| 11,502,303 B2 | 11/2022 | Slezak |
| 2008/0241683 A1 | 10/2008 | Fensore et al. |
| 2010/0178543 A1 | 7/2010 | Gruner et al. |
| 2013/0071736 A1 | 3/2013 | Xiao et al. |
| 2014/0099528 A1 | 4/2014 | Lockett et al. |
| 2014/0199578 A1 | 7/2014 | Mitra et al. |
| 2014/0302373 A1 | 10/2014 | Lockett et al. |
| 2015/0017497 A1 | 1/2015 | Morris |
| 2015/0200395 A1* | 7/2015 | Stevanovic ............ H01M 4/136 429/163 |
| 2015/0349344 A1* | 12/2015 | Shelekhin ............. H01M 4/625 252/182.1 |

* cited by examiner

SINGLE-WALLED CARBON NANOTUBES IN ALKALINE ELECTROCHEMICAL CELL ELECTRODES

CROSS-REFERENCE TO RELATED APPLICATION

This application is a continuation of U.S. patent application Ser. No. 16/547,990, filed Aug. 22, 2019, which claims the benefit of U.S. Provisional Application No. 62/721,245, filed Aug. 22, 2018, which are incorporated by reference herein in their entirety.

BACKGROUND

A number of different types of batteries comprise carbon as part of an electrode to improve conductivity. One such type, alkaline electrochemical cells, are commercially available in cell sizes commonly known as LR6 (AA), LR03 (AAA), LR14 (C) and LR20 (D). The cells have a cylindrical shape that must comply with the dimensional standards that are set by organizations such as the International Electrotechnical Commission. The electrochemical cells are utilized by consumers to power a wide range of electrical devices, for example, clocks, radios, toys, electronic games, film cameras generally including a flashbulb unit, as well as digital cameras. Such electrical devices possess a wide range of electrical discharge conditions, such as from low drain to relatively high drain. Due to the increased use of high drain devices, such as digital cameras, it is desirable for a manufacturer to produce a battery that possesses desirable high drain discharge properties.

As the shape and size of the batteries are often fixed, battery manufacturers must modify cell characteristics to provide increased performance. Attempts to address the problem of how to improve a battery's performance in a particular device have usually involved changes to the cell's internal construction. For example, cell construction has been modified by increasing the quantity of active materials utilized within the cell.

Manganese dioxide ($MnO_2$) is a well-known substance commonly used in electrochemical cells, such as dry cell batteries, as an active cathode material, often in the form of electrolytic manganese dioxide (EMD). Conductive carbon can be added to the cathode in order to increase the conductivity of the cathode. This can increase performance of the cathode, particularly in high drain applications. However, because replacing EMD with carbon reduces the amount of EMD, the overall capacity of the battery is reduced. Thus, it is desirable to produce an EMD/carbon electrode with less carbon (i.e. a higher oxide-to-carbon ratio, or O:C), so as to obtain the benefit of the carbon's conductivity while making a minimal tradeoff in capacity.

It was in an effort to overcome the limitations of the above-described cells, and other such cells, that the present embodiments were designed.

BRIEF SUMMARY

An embodiment is an electrode comprising i) a conductive carbon selected from the group consisting of carbon nanotubes and graphene, and ii) an active material which is an oxide.

An embodiment is an electrochemical cell comprising such an electrode.

An embodiment is a method of producing such an electrode, comprising blending the conductive carbon with electrode mix prior to forming the electrode.

DETAILED DESCRIPTION

Figure 1:
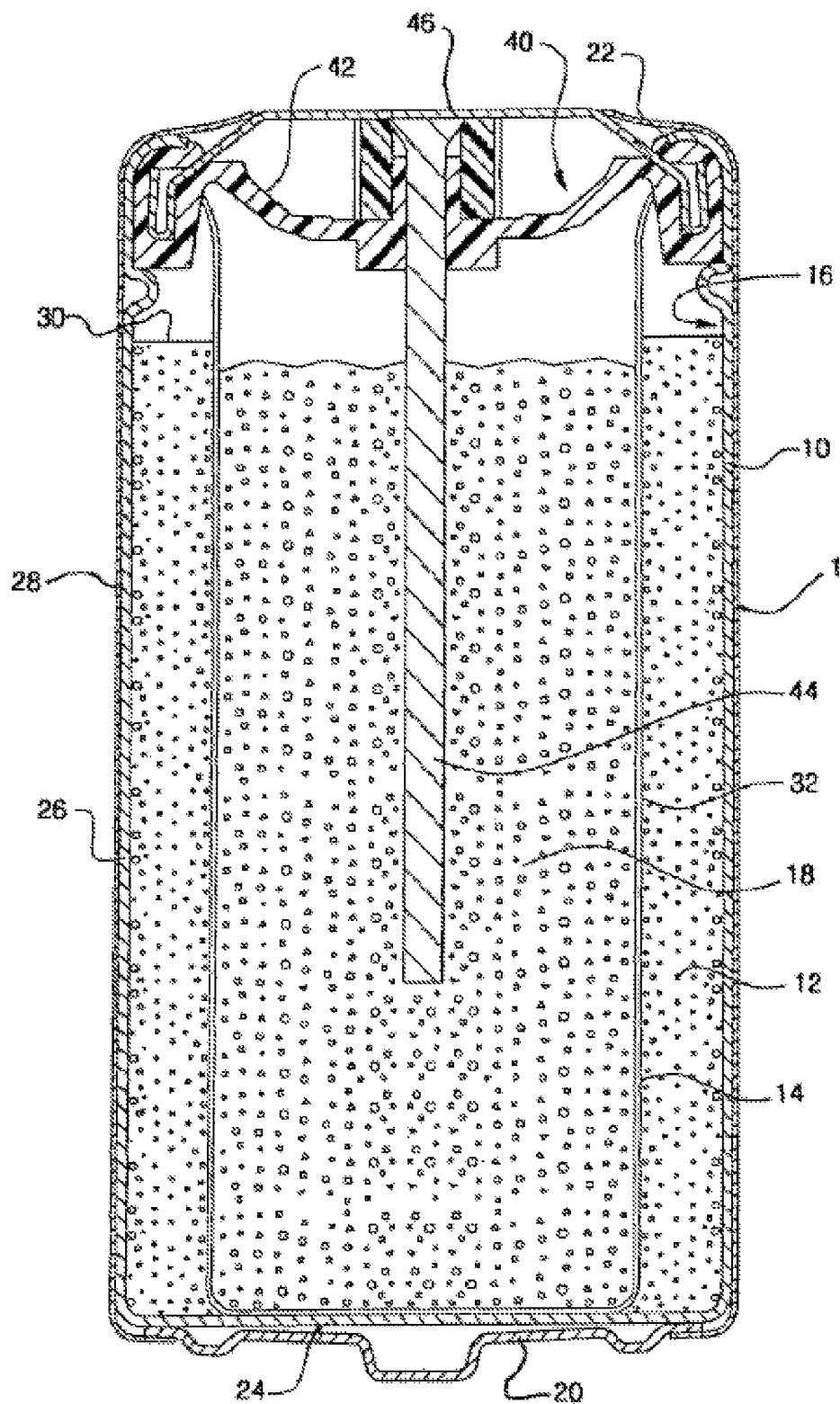
FIG. 1 is a cross-sectional elevational view of an alkaline electrochemical cell of an embodiment.

Various embodiments now will be described more fully hereinafter with reference to the accompanying drawings, in which some, but not all embodiments are shown. Indeed, various embodiments may be embodied in many different forms and should not be construed as limited to the embodiments set forth herein; rather, these embodiments are provided so that this disclosure will satisfy applicable legal requirements. Like numbers refer to like elements throughout. In the following description, various components may be identified as having specific values or parameters, however, these items are provided as exemplary embodiments. Indeed, the exemplary embodiments do not limit the various aspects and concepts of the embodiments as many comparable parameters, sizes, ranges, and/or values may be implemented. The terms "first," "second," and the like, "primary," "exemplary," "secondary," and the like, do not denote any order, quantity, or importance, but rather are used to distinguish one element from another. Further, the terms "a," "an," and "the" do not denote a limitation of quantity, but rather denote the presence of "at least one" of the referenced item. For example, "a conductive carbon" may refer to two or more conductive carbons.

Each embodiment disclosed herein is contemplated as being applicable to each of the other disclosed embodiments. All combinations and sub-combinations of the various elements described herein are within the scope of the embodiments.

It is understood that where a parameter range is provided, all integers and ranges within that range, and tenths and hundredths thereof, are also provided by the embodiments. For example, "5-10%" includes 5%, 6%, 7%, 8%, 9%, and 10%; 5.0%, 5.1%, 5.2% . . . 9.8%, 9.9%, and 10.0%; and 5.00%, 5.01%, 5.02% . . . 9.98%, 9.99%, and 10.00%, as well as, for example, 6-9%, 5.1%-9.9%, and 5.01%-9.99%.

As used herein, "about" in the context of a numerical value or range means within ±10% of the numerical value or range recited or claimed.

As used herein, an "EMD/C" mixture refers to a mixture of EMD and any carbon. The carbon may be in the form of carbon nanotubes, graphene, and/or graphite, as non-limiting examples. For example, an EMD/C mixture may comprise EMD, SWCNTs, and expanded graphite. The specific types of carbon may be specified, such as an EMD/expanded graphite mixture or an EMD/SWCNT/expanded graphite mixture.

As used herein, "synergistic," in terms of an effect, refers to the case where an electrochemical cell comprising two conductive carbons (CC1 and CC2) exhibits a greater decrease in cathode resistivity, or some other property or metric of performance, compared to an electrochemical cell lacking the conductive carbons than would be expected based on the improvements exhibited by two electrochemical cells, one comprising CC1 and one comprising CC2.

As used herein, "improvement" with respect to resistivity means that the resistivity is decreased. Generally, an "improvement" of a property or metric of performance of a material or electrochemical cell means that the property or metric of performance differs (compared to that of a different material or electrochemical cell) in a manner that a user or manufacturer of the material or cell would find desirable (i.e. costs less, lasts longer, provides more power, more durable, easier or faster to manufacture, etc.).

As used herein, "oxide" refers to a chemical compound that contains at least one oxygen atom and one other element. One class of oxides is metal oxides.

As used herein, a "primary" electrochemical cell is a non-rechargeable (i.e. disposable) electrochemical cell. A "secondary" electrochemical cell is a rechargeable electrochemical cell.

As used herein, "resistivity" refers to how strongly a given material opposes the flow of electric current through itself. This is typically measured in ohm-meters (ohm-m) or ohm-centimeters (ohm-cm).

As used herein, "run-time" refers to the length of time that an electrochemical cell will be able to provide a certain level of charge.

An embodiment is an electrode comprising i) a conductive carbon selected from the group consisting of carbon nanotubes and graphene, and ii) an active material which is an oxide.

In an embodiment, the carbon nanotubes are single-walled carbon nanotubes (SWCNTs). In an embodiment, the electrode further comprises graphite. In an embodiment, the graphite is expanded graphite. In an embodiment, the active material is manganese dioxide, a nickelate, nickel oxyhydroxide, or copper oxide.

In an embodiment, the electrode comprises carbon nanotubes in a concentration of 0.01 wt %-5 wt %, or 0.05 wt %-4 wt %, or 0.1 wt %-3 wt %, or 1 wt %-2 wt %, wherein the total weight of the electrode is 100%. In an embodiment, the oxide to carbon (O:C) ratio is from 10:1-90:1, or 15:1-75:1, or 20:1-50:1, or 25:1-45:1, or 30:1-40:1. In an embodiment, the electrode comprises $MnO_2$ in the form of electrolytic manganese dioxide (EMD), chemical manganese dioxide (CMD), or natural manganese dioxide (NMD). In an embodiment, the electrode comprises EMD.

In an embodiment, the electrode has a resistivity that is less than that of a similar electrode which has an identical O:C ratio, but does not comprise the conductive carbon. In an embodiment, the resistivity is from 1% less to 90% less, or from 5% less to 80% less, or from 10% less to 70% less, or from 15% less to 60% less, or from 20% less to 50% less, or from 25% less to 40% less, or from 30% less to 35% less.

An embodiment is an electrochemical cell comprising any of the above electrodes. In an embodiment, the electrochemical cell is a primary cell. In an embodiment, the electrochemical cell is a primary cell. In an embodiment, the electrochemical cell comprises an anode having an active material selected from the group consisting of zinc, magnesium, aluminum and silicon. In an embodiment, the electrochemical cell comprises an electrolyte solution which comprises potassium hydroxide (KOH), sodium hydroxide (NaOH), lithium hydroxide (LiOH), magnesium hydroxide ($Mg(OH)_2$), calcium hydroxide ($Ca(OH)_2$), magnesium perchlorate ($Mg(ClO_4)_2$), magnesium chloride ($MgCl_2$), or magnesium bromide ($MgBr_2$). In an embodiment, the electrochemical cell has a voltage that is 0.1 V-2.0 V, 0.2 V-1.9 V, 0.3 V-1.8 V, 0.4 V-1.7 V, 0.5 V-1.6 V, 0.6 V-1.5 V, 0.7 V-1.4 V, 0.8 V-1.3 V, 0.9 V-1.2 V, 1.0 V-1.1 V, or is 0.1 V, 0.2 V, 0.3 V, 0.4 V, 0.5 V, 0.6 V, 0.7 V, 0.8 V, 0.9 V, 1.0 V, 1.1 V, 1.2 V, 1.3 V, 1.4 V, 1.5 V, 1.6 V, 1.7 V, 1.8 V, 1.9 V, or 2.0 V. In an embodiment, the electrochemical cell is an alkaline electrochemical cell.

An embodiment is an electrochemical cell comprising a cathode, said cathode comprising EMD, SWCNTs, and expanded graphite, and said cathode having an O:C ratio of 20:1-60:1.

An embodiment is a method of producing any of said electrodes, comprising blending the conductive carbon with electrode mix prior to forming the electrode. In an embodiment, the electrode is a cathode.

The embodiments will be better understood by reference to FIG. 1 which shows a cylindrical cell 1 in elevational cross-section, with the cell having a nail-type or bobbin-type construction and dimensions comparable to a conventional LR6 (AA) size alkaline cell, which is particularly well-suited to the embodiments. However, it is to be understood that cells according to the embodiments can have other sizes and shapes, such as a prismatic or button-type shape; and other electrode configurations, as known in the art. The materials and designs for the components of the electrochemical cell illustrated in FIG. 1 are for the purposes of illustration, and other materials and designs may be substituted. Moreover, in certain embodiments, the cathode and anode materials may be coated onto a surface of a separator and/or current collector and rolled to form a "jelly roll" configuration.

In FIG. 1, an electrochemical cell 1 is shown, including a container or can 10 having a closed bottom end 24, a top end 22 and sidewall 26 there between. The closed bottom end 24 includes a terminal cover 20 including a protrusion. The can 10 has an inner wall 16. In the embodiment, a positive terminal cover 20 is welded or otherwise attached to the bottom end 24. In one embodiment, the terminal cover 20 can be formed with plated steel for example with a protruding nub at its center region. Container 10 can be formed of a metal, such as steel, preferably plated on its interior with nickel, cobalt and/or other metals or alloys, or other materials, possessing sufficient structural properties that are compatible with the various inputs in an electrochemical cell. A label 28 can be formed about the exterior surface of container 10 and can be formed over the peripheral edges of the positive terminal cover 20 and negative terminal cover 46, so long as the negative terminal cover 46 is electrically insulated from container 10 and positive terminal 20.

Disposed within the container 10 are a first electrode 18 and second electrode 12 with a separator 14 therebetween. First electrode 18 is disposed within the space defined by separator 14 and closure assembly 40 secured to open end 22 of container 10. Closed end 24, sidewall 26, and closure assembly 40 define a cavity in which the electrodes of the cell are housed.

Closure assembly 40 comprises a closure member 42 such as a gasket, a current collector 44 and conductive terminal 46 in electrical contact with current collector 44. Closure member 42 preferably contains a pressure relief vent that will allow the closure member to rupture if the cell's internal pressure becomes excessive. Closure member 42 can be formed from a polymeric or elastomer material, for example Nylon-6,6, an injection-moldable polymeric blend, such as polypropylene matrix combined with poly(phenylene oxide) or polystyrene, or another material, such as a metal, provided that the current collector 44 and conductive terminal 46 are electrically insulated from container 10 which serves as the current collector for the second electrode 12. In the embodiment illustrated, current collector 44 is an elongated nail or bobbin-shaped component. Current collector 44 is made of metal or metal alloys, such as copper or brass, conductively plated metallic or plastic collectors or the like. Other suitable materials can be utilized. Current collector 44 is inserted through a preferably centrally located hole in closure member 42.

First electrode 18 is preferably a negative electrode or anode. The negative electrode includes a mixture of one or more active materials, an electrically conductive material, solid zinc oxide, and a surfactant. The negative electrode can optionally include other additives, for example a binder or a gelling agent, and the like.

Zinc is an example main active material for the negative electrode of the embodiments. Mercury and magnesium may also be used. Preferably, the volume of active material utilized in the negative electrode is sufficient to maintain a desired particle-to-particle contact and a desired anode to cathode (A:C) ratio.

Particle-to-particle contact should be maintained during the useful life of the battery. If the volume of active material in the negative electrode is too low, the cell's voltage may suddenly drop to an unacceptably low value when the cell is powering a device. The voltage drop is believed to be caused by a loss of continuity in the conductive matrix of the negative electrode. The conductive matrix can be formed from undischarged active material particles, conductive electrochemically formed oxides, or a combination thereof. A voltage drop can occur after oxide has started to form, but before a sufficient network is built to bridge between all active material particles present.

Zinc suitable for use in the embodiments may be purchased from a number of different commercial sources under various designations, such as BIA 100, BIA 115. Umicore, S. A., Brussels, Belgium is an example of a zinc supplier. In a preferred embodiment, the zinc powder generally has 25 to 40 percent fines less than 75 µm, and preferably 28 to 38 percent fines less than 75 µm. Generally, lower percentages of fines will not allow desired digital still camera (DSC) test service to be realized and utilizing a higher percentage of fines can lead to increased gassing. A correct zinc alloy is needed in order to reduce negative electrode gassing in cells and to maintain test service results.

A surfactant that is either a nonionic or anionic surfactant, or a combination thereof is present in the negative electrode. It has been found that anode resistance is increased during discharge by the addition of solid zinc oxide alone, but is mitigated by the addition of the surfactant. The addition of the surfactant increases the surface charge density of the solid zinc oxide and lowers anode resistance as indicated above. Use of a surfactant is believed to aid in forming a more porous discharge product when the surfactant adsorbs on the solid zinc oxide. When the surfactant is anionic, it carries a negative charge and, in alkaline solution, surfactant adsorbed on the surface of the solid zinc oxide is believed to change the surface charge density of the solid zinc oxide particle surfaces. The adsorbed surfactant is believed to cause a repulsive electrostatic interaction between the solid zinc oxide particles. It is believed that the surfactant reduces anode resistance increase caused by the addition of solid zinc oxide because the adsorbed surfactant on solid zinc oxide results in enhanced surface charge density of solid zinc oxide particle surface. The higher the BET surface area of solid zinc oxide, the more surfactant can be adsorbed on the solid zinc oxide surface. One example surfactant is DISPERBYK-190 from BYK-Chemie GmbH of Wesel, Germany.

The aqueous alkaline electrolyte comprises an alkaline metal hydroxide such as potassium hydroxide (KOH), sodium hydroxide (NaOH), or the like, or mixtures thereof. Potassium hydroxide is preferred. The alkaline electrolyte used to form the gelled electrolyte of the negative electrode contains the alkaline metal hydroxide in an amount from about 26 to about 36 weight percent, for example from about 26 to about 32 weight percent, and specifically from about 26 to about 30 weight percent based on the total weight of the alkaline electrolyte. Interaction takes place between the negative electrode alkaline metal hydroxide and the added solid zinc oxide, and it has been found that lower alkaline metal hydroxide improves DSC service. Electrolytes which are less alkaline are preferred, but can lead to rapid electrolyte separation of the anode. Increase of alkaline metal hydroxide concentration creates a more stable anode, but can reduce DSC service.

A gelling agent is preferably utilized in the negative electrode as is well known in the art, such as a crosslinked polyacrylic acid, such as Carbopol® 940, which is available from Noveon, Inc. of Cleveland, Ohio, USA. Carboxymethylcellulose, polyacrylamide and sodium polyacrylate are examples of other gelling agents that are suitable for use in an alkaline electrolyte solution. Gelling agents are desirable in order to maintain a substantially uniform dispersion of zinc and solid zinc oxide particles in the negative electrode. The amount of gelling agent present is chosen so that lower rates of electrolyte separation are obtained and anode viscosity in yield stress are not too great which can lead to problems with anode dispensing.

Other components which may be optionally present within the negative electrode include, but are not limited to, gassing inhibitors, organic or inorganic anticorrosive agents, plating agents, binders or other surfactants. Examples of gassing inhibitors or anticorrosive agents can include indium salts, such as indium hydroxide, perfluoroalkyl ammonium salts, alkali metal sulfides, etc. In one embodiment, dissolved zinc oxide is present preferably via dissolution in the electrolyte, in order to improve plating on the bobbin or nail current collector and to lower negative electrode shelf gassing. The dissolved zinc oxide added is separate and distinct from the solid zinc oxide present in the anode composition. Levels of dissolved zinc oxide in an amount of about 1 weight percent based on the total weight of the negative electrode electrolyte are preferred in one embodiment. The soluble or dissolved zinc oxide generally has a BET surface area of about 4 $m^2/g$ or less measured utilizing a Tristar 3000 BET specific surface area analyzer from Micrometrics having a multi-point calibration after the zinc oxide has been degassed for one hour at 1500° C.; and a particle size D50 (median diameter) of about 1 micron, measured using a CILAS particle size analyzer as indicated above. In a further embodiment, sodium silicate in an amount of about 0.3 weight percent based on the total weight of the negative electrode electrolyte is preferred in the negative electrode in order to substantially prevent cell shorting through the separator during cell discharge.

The negative electrode can be formed in a number of different ways as known in the art. For example, the negative electrode components can be dry blended and added to the cell, with alkaline electrolyte being added separately or, as in a preferred embodiment, a pre-gelled negative electrode process is utilized.

In one embodiment, the zinc and solid zinc oxide powders, and other optional powders other than the gelling agent, are combined and mixed. Afterwards, the surfactant is introduced into the mixture containing the zinc and solid zinc oxide. A pre-gel comprising alkaline electrolyte, soluble zinc oxide and gelling agent, and optionally other liquid components, are introduced to the surfactant, zinc and solid zinc oxide mixture which are further mixed to obtain a substantially homogenous mixture before addition to the cell. Alternatively, in a further preferred embodiment, the solid zinc oxide is predispersed in a negative electrode pre-gel comprising the alkaline electrolyte, gelling agent, soluble zinc oxide and other desired liquids, and blended, such as for about 15 minutes. The solid zinc oxide and surfactant are then added and the negative electrode is blended for an additional period of time, such as about 20 minutes. The amount of gelled electrolyte utilized in the negative electrode is generally from about 25 to about 35 weight percent, and for example, about 32 weight percent based on the total weight of the negative electrode. Volume percent of the gelled electrolyte may be about 70% based on the total volume of the negative electrode. In addition to the aqueous alkaline electrolyte absorbed by the gelling agent during the negative electrode manufacturing process, an additional quantity of an aqueous solution of alkaline metal hydroxide, i.e., "free electrolyte", may also be added to the cell during the manufacturing process. The free electrolyte may be incorporated into the cell by disposing it into the cavity defined by the positive electrode or negative electrode, or combinations thereof. The method used to incorporate free electrolyte into the cell is not critical provided it is in contact with the negative electrode, positive electrode, and separator. In one embodiment, free electrolyte is added both prior to addition of the negative electrode mixture as well as after addition. In one embodiment, about 0.97 grams of 29 weight percent KOH solution is added to an LR6 type cell as free electrolyte, with about 0.87 grams added to the separator lined cavity before the negative electrode is inserted. The remaining portion of the 29 weight percent KOH solution is injected into the separator lined cavity after the negative electrode has been inserted.

Second electrode 12, also referred to herein as the positive electrode or cathode, includes manganese dioxide ($MnO_2$) as the electrochemically active material. The $MnO_2$ is often in the form of electrolytic manganese dioxide (EMD). EMD is present in an amount generally from about 80 to about 86 weight percent and preferably from about 81 to 85 weight percent based on the total weight of the positive electrode, i.e., manganese dioxide, conductive material(s), positive electrode electrolyte, and additives, if present. The positive electrode is formed by combining and mixing desired components of the electrode followed by dispensing a quantity of the mixture into the open end of the container and then using a ram to mold the mixture into a solid tubular configuration that defines a cavity within the container in which the separator 14 and first electrode 18 are later disposed (known as impact molding). Second electrode 12 has a ledge 30 and an interior surface 32 as illustrated in FIG. 1. Alternatively, the positive electrode may be formed by pre-forming a plurality of rings from the mixture comprising EMD, and then inserting the rings into the container to form the tubular-shaped second electrode (known as ring molding). The cell shown in FIG. 1 would typically include 3 or 4 rings.

The positive electrode includes conductive material, including at least one conductive carbon, as discussed previously. In an embodiment, the conductive carbon is carbon nanotubes. In an embodiment, the carbon nanotubes are single-walled carbon nanotubes (SWCNTs). In another embodiment, the conductive carbon is graphene. In another embodiment, the conductive carbon is graphite, which may be expanded or non-expanded. In another embodiment, the carbon is a mixture of carbon nanotubes, such as SWCNTs, and expanded graphite. Suppliers of SWCNTs include OCSiAl of Leudelange, Luxembourg, and KH Chemicals of Zwijindrect, Netherlands. Suppliers of graphite for use in alkaline batteries include Timcal America of Westlake, Ohio; Superior Graphite Company of Chicago, Ill.; and Lonza, Ltd. of Basel, Switzerland.

The conductive material, when mixed with the EMD, provides an electrically conductive matrix substantially throughout the positive electrode. The O:C ratio (meaning a ratio of the total amount of oxide, such as EMD, to the total amount of conductive carbon, including carbon nanotubes and/or expanded graphite), in a preferred embodiment, may range from about 15:1 to about 90:1. Too much conductive carbon can reduce EMD input, and thus cell capacity; too little conductive carbon can increase container to cathode contact resistance and/or bulk cathode resistance, which affects the overall cell resistance and can have a potential effect on high rate tests, such as the DSC test (in which a battery's high drain capabilities are determined by the number of photographs that a digital still camera may take on a single charge), or higher cut-off voltages.

An example of an additional cathode additive is barium sulfate ($BaSO_4$), which is commercially available from Bario E. Derivati S.p.A. of Massa, Italy. The barium sulfate is present in an amount generally from about 1 to about 2 weight percent based on the total weight of the positive electrode. Other additives can include, for example, barium acetate, titanium dioxide, binders such as Coathylene® (Axalta Coating Systems, Glen Mills, PA), and calcium stearate.

One of the parameters utilized by cell designers characterizes cell design as the ratio of one electrode's electrochemical capacity to the opposing electrode's electrochemical capacity, such as the anode (A) to cathode (C) ratio, i.e., A:C ratio. For an LR6 type alkaline primary cell that utilizes zinc in the negative electrode or anode and $MnO_2$ in the positive electrode or cathode, the A:C ratio may be greater than 1.32:1, such as greater than 1.34:1, and specifically 1.36:1 for impact molded positive electrodes. The A:C ratio for ring molded positive electrodes can be lower, such as about 1.2:1 to about 1.1:1.

Separator 14 is provided in order to separate first electrode 18 from second electrode 12. Separator 14 maintains a physical dielectric separation of the positive electrode's electrochemically active material from the electrochemically active material of the negative electrode and allows for transport of ions between the electrode materials. In addition, the separator acts as a wicking medium for the electrolyte and as a collar that prevents fragmented portions of the negative electrode from contacting the top of the positive electrode. Separator 14 can be a layered ion permeable, non-woven fibrous fabric. A typical separator usually includes two or more layers of paper. Conventional separators are usually formed either by pre-forming the separator material into a cup-shaped basket that is subsequently inserted under the cavity defined by second electrode 12 and closed end 24 and any positive electrode material thereon, or forming a basket during cell assembly by inserting two rectangular sheets of separator into the cavity with the material angularly rotated 900 relative to each other. Conventional pre-formed separators are typically made up of a sheet of non-woven fabric rolled into a cylindrical shape that conforms to the inside walls of the second electrode and has a closed bottom end.

All of the references cited above, as well as all references cited herein, are incorporated herein by reference in their entireties.

While embodiments have been illustrated and described in detail above, such illustration and description are to be considered illustrative or exemplary and not restrictive. It will be understood that changes and modifications may be made by those of ordinary skill within the scope and spirit of the following claims. In particular, embodiments include any combination of features from different embodiments described above and below.

The embodiments are additionally described by way of the following illustrative non-limiting examples that provide a better understanding of the embodiments and of its many advantages. The following examples are included to demonstrate preferred embodiments. It should be appreciated by those of skill in the art that the techniques disclosed in the examples which follow represent techniques used in the embodiments to function well in the practice of the embodiments, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the embodiments.

Examples and Discussion

EMD/graphite cathodes were tested previously, in an effort to improve service. Conventional crystalline graphite was found to increase resistance above 17.5:1 O:C weight ratio. At higher ratios, the resistance would increase, resulting in poor cathode efficiency of the cathode, and lower overall cathode performance. Circa 2000, a new type of carbon was formed, in which large natural crystalline graphite was exfoliated to pull apart layers of graphite (known as "expanded graphite"). The reduced density of layers improved conductivity. However, practically, the highest O:C ratio achieved was 25:1. See U.S. Pat. No. 6,828,064, the contents of which are hereby incorporated by reference in their entirety.

It wasn't until the invention of single wall carbon nanotubes that conductivity of carbon could be improved significantly. With these new materials, it has been found that O:C ratios of up to 60:1 or greater can now be used. Carbon materials were screened through a cathode mix pellet resistivity test. It was confirmed through ¼ AA cells that performance is at least equivalent to the 20:1 mixes under these high drain applications. Performance improvement will be seen as result of the increased amount of EMD added on the lower rate tests. Potentially, an increase on the 50 and 100 mA tests of 2% can be realized, with smaller increases on the higher rate tests (overall ANSI may be 0.25% or higher).

While this disclosure and the subsequent experiments reference carbon nanotubes, and in particular SWCNTs, the embodiments may also be used with any carbon that results in a resistivity of less than 0.8 ohm-cm when mixed with EMD at weight percent of less than 3.8%. This includes graphene.

Experiments were performed to assess the benefit of using SWCNTs in alkaline cathodes as a means to reduce the total amount of carbon in the cathode. The SWCNTs were evaluated as a direct replacement, partial replacement, and/or an additive for the carbon already present (in the form of expanded graphite). The goal was to reduce the amount of carbon (i.e. increase the amount of EMD) while maintaining conductivity in the mixture.

Figure 2A:
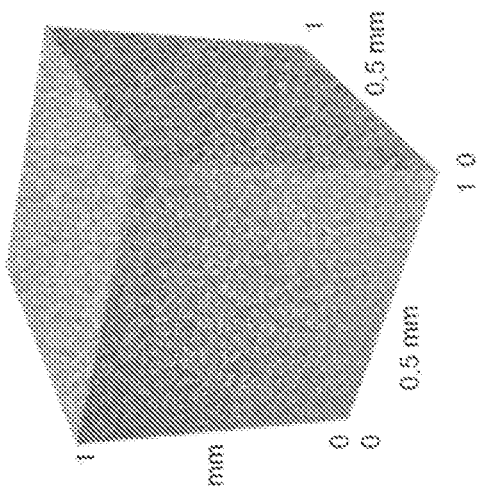
FIGS. 2A-2C are illustrations of carbon dispersed in a matrix, in the forms of microparticles, carbon nanofibers, and single-walled carbon nanotubes (SWCNTs), respectively.
Figure 2B:
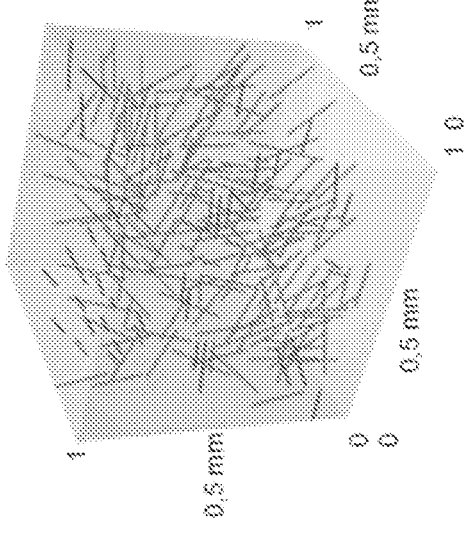
Figure 2C:
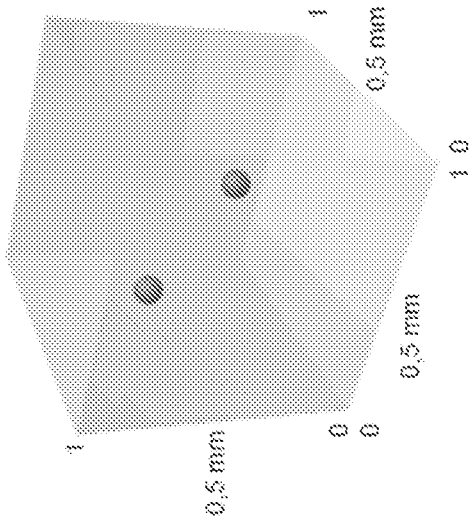

FIGS. 2A-2C illustrate different forms of carbon dispersed in a matrix, such as EMD, at a concentration of approximately 0.1% by weight. The forms are, from left to right, microparticles, carbon nanofibers, and SWCNTs. Because individual graphene sheets (which make up the carbon nanofibers seen in FIG. 2B) have very high internal conductivity, and carbon nanotubes are essentially rolled-up single graphene sheets (FIG. 2C), the SWCNTs have high degrees of internal conductivity. Further, as seen in FIG. 2, the SWCNTs are able to form a conductive 3D network throughout the matrix at low concentrations, while the microparticles and nanofibers are unable to do so.

Figure 3B:
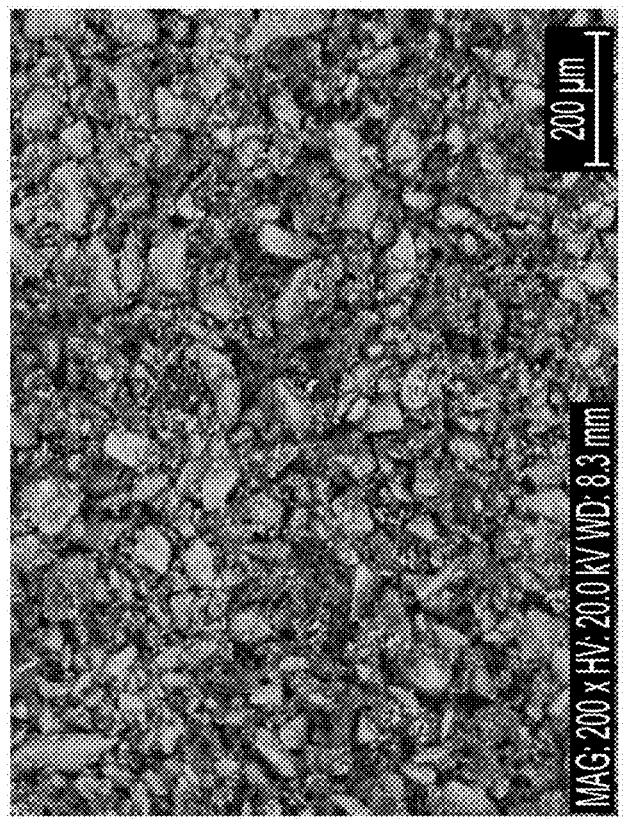
FIGS. 3A and 3B show back-scatter electron (BSE) images of 25:1 EMD/SWCNT and EMD/expanded graphite mixtures, respectively.
Figure 3A:
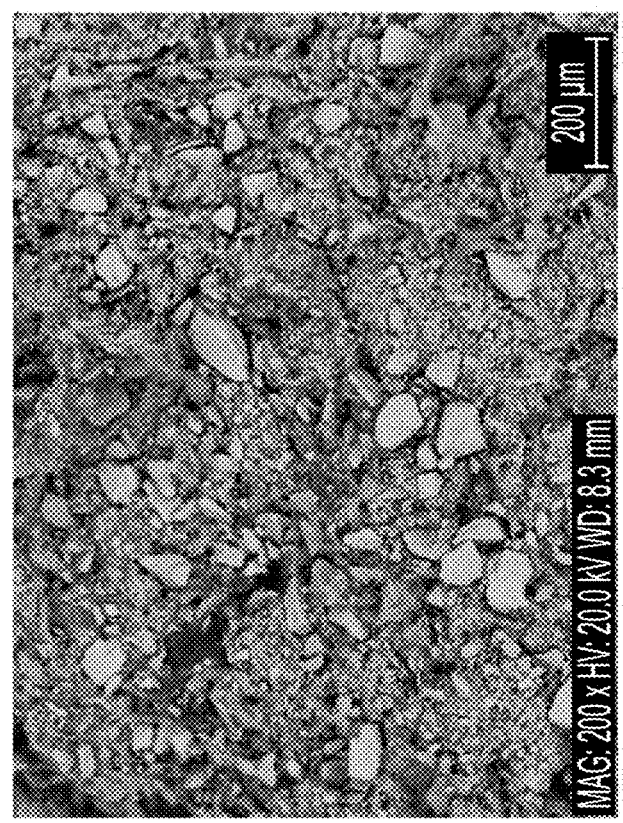

FIGS. 3A and 3B show back-scatter electron (BSE) images of cathode mixes used in the experiments. FIG. 3A shows a 25:1 EMD/SWCNT mixture, and FIG. 3B shows a 25:1 EMD/expanded graphite mixture. The SWCNTs are Tuball™, obtained from OCSiAl (Leudelange, Luxembourg) and the expanded graphite is GA17, obtained from Superior Graphite (Chicago, Ill.).

Figure 4:
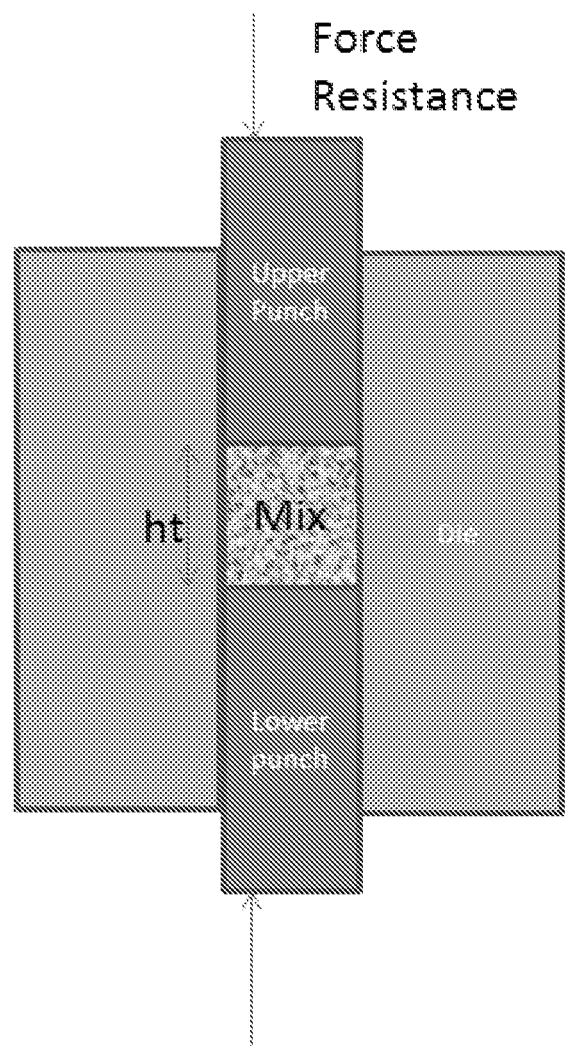
FIG. 4 is a schematic of the pellet compression setup used in some of the experiments detailed herein.

The EMD/carbon mixtures were compressed into pellets, while simultaneously measuring the pressure and resistance of the mixture. A schematic diagram of the experimental compression setup is illustrated in FIG. 4. This process was used to determine how compaction affected resistivity.

Figure 5:
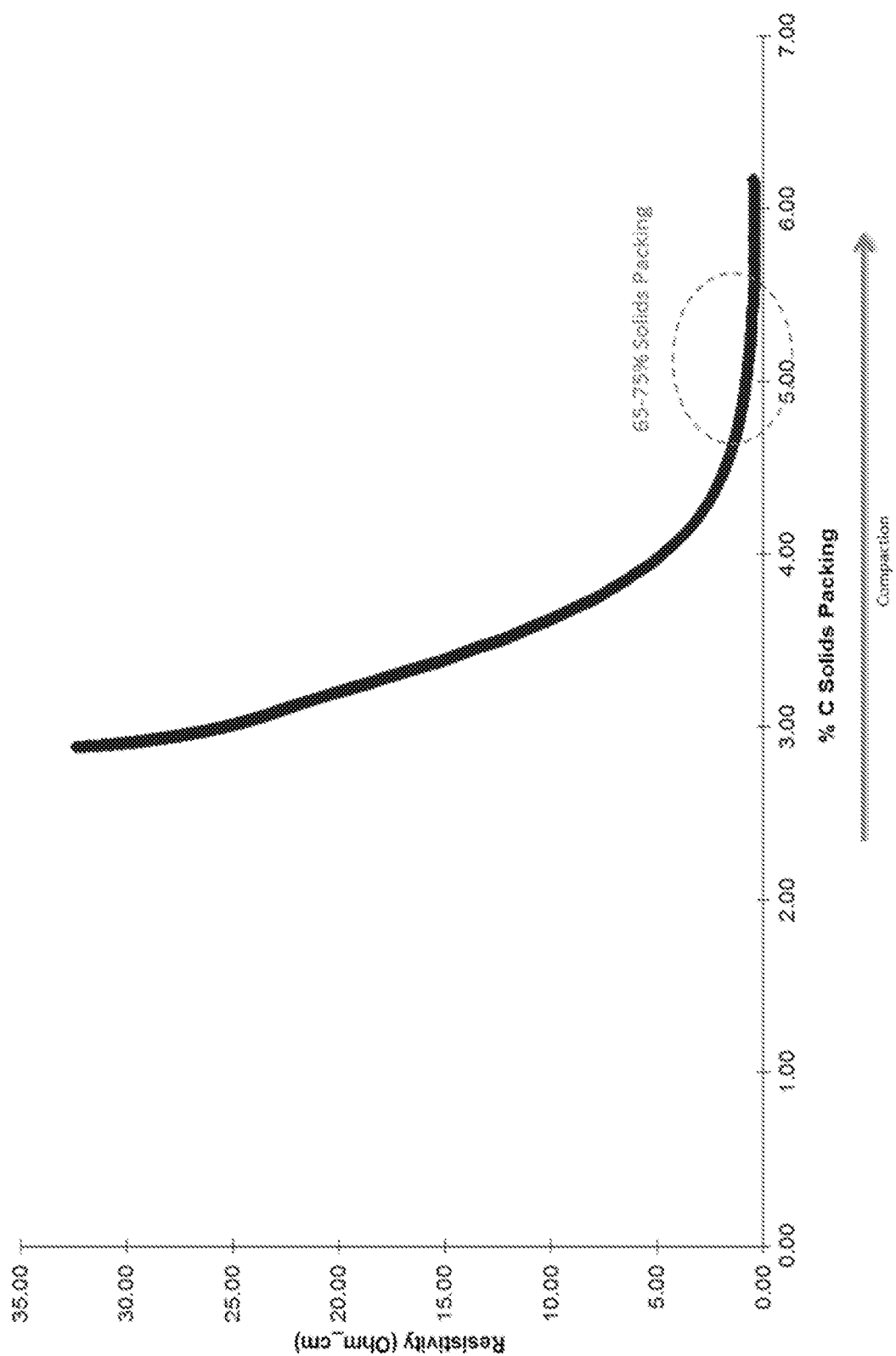
FIG. 5 shows resistivity vs. compaction data for a 25:1 EMD/expanded graphite mix.

This was measured for a pellet comprising EMD (Tronox HD, from Tronox, Stamford, CT) and expanded graphite (GA17), in a 25:1 O:C ratio, as a baseline. Resistivity (ohms-cm) was compared to the compaction of the pellet, measured in terms of % C solids packing (meaning the percent of the pellet volume that is carbon). A 50 mA DC current was run across the pellet. As the pellet was compressed, a greater percentage of the pellet's volume was carbon, and the resistivity decreased. The results are shown in FIG. 5. Further, the dotted oval on the plot indicates the range of 65-75% solids packing (meaning the volume of the pellet that is made of solids, as opposed to moisture or air.

The approximate degree of packing for an impact molding (IM) process and a ring molding (RM) process are indicated by the solid ovals.

Figure 6:
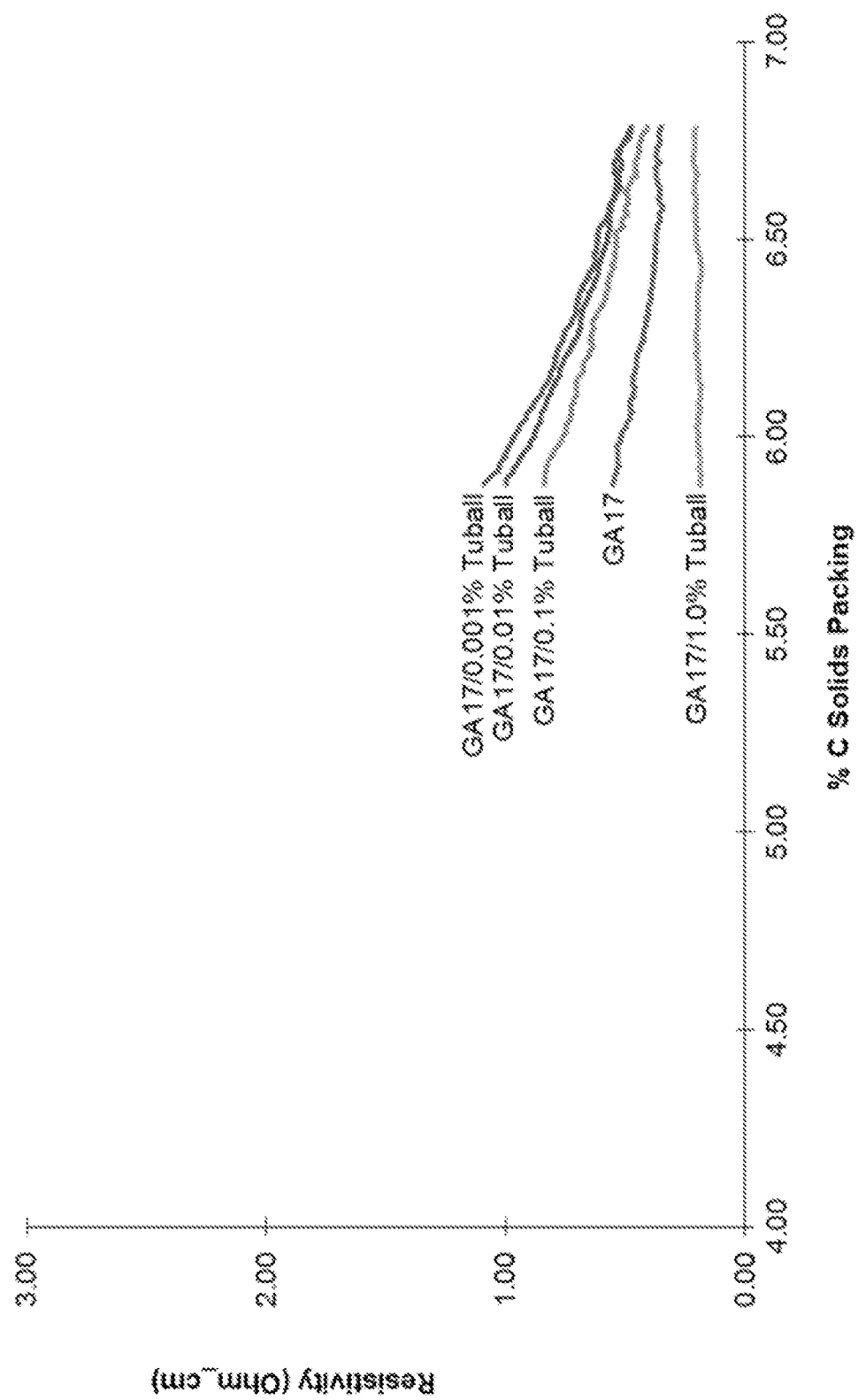
FIG. 6 shows resistivity vs. compaction data for five different 20:1 EMD/C mixes, having differing levels of SWCNTs.

Next, five pellets of 20:1 EMD/C mixtures were tested. The carbon in one of these pellets was expanded graphite, alone, while in the other four pellets, the carbon was expanded graphite with some portion replaced by SWCNTs. The percentage of total carbon (expanded graphite and SWCNTs, combined) used to make each of the five pellets was identical. The results, in the range of 65-75% solids packing are shown in FIG. 6. It is evident that for the four pellets comprising some amount of SWCNTs, increasing the amount of SWCNTs decreased the resistivity of the pellet at all degrees of packing in the 65-75% solids packing range. Further, the pellet that was 1% SWCNTs (in other words, SWCNTs comprise 1% of the total mass of the EMD and carbon, combined) demonstrated significantly decreased resistivity compared to the pellet comprising pure expanded graphite as its carbon, at all degrees of packing in the range.

Figure 7:
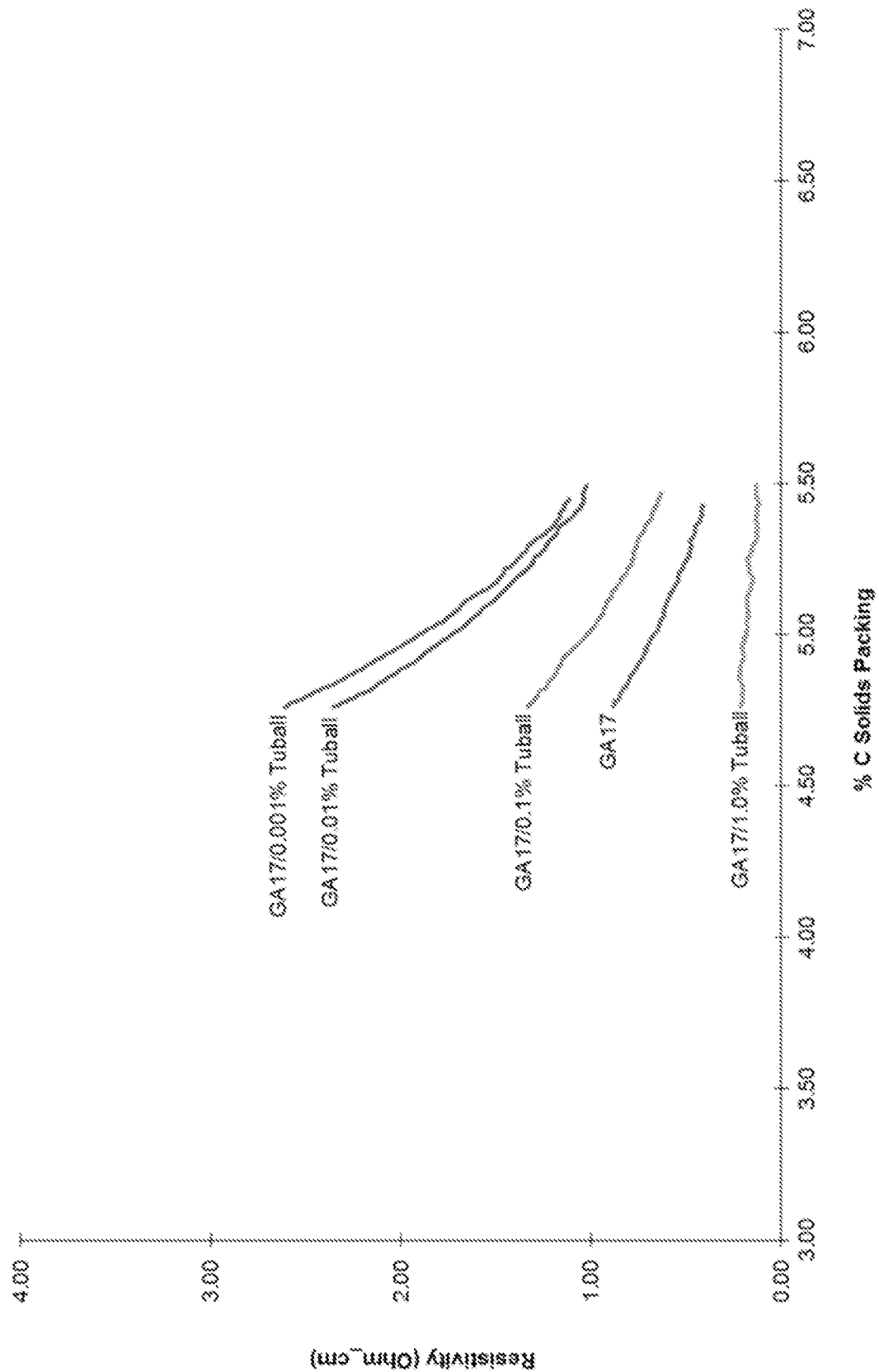
FIG. 7 shows resistivity vs. compaction data for five different 25:1 EMD/C mixes, having differing levels of SWCNTs.
Figure 8:
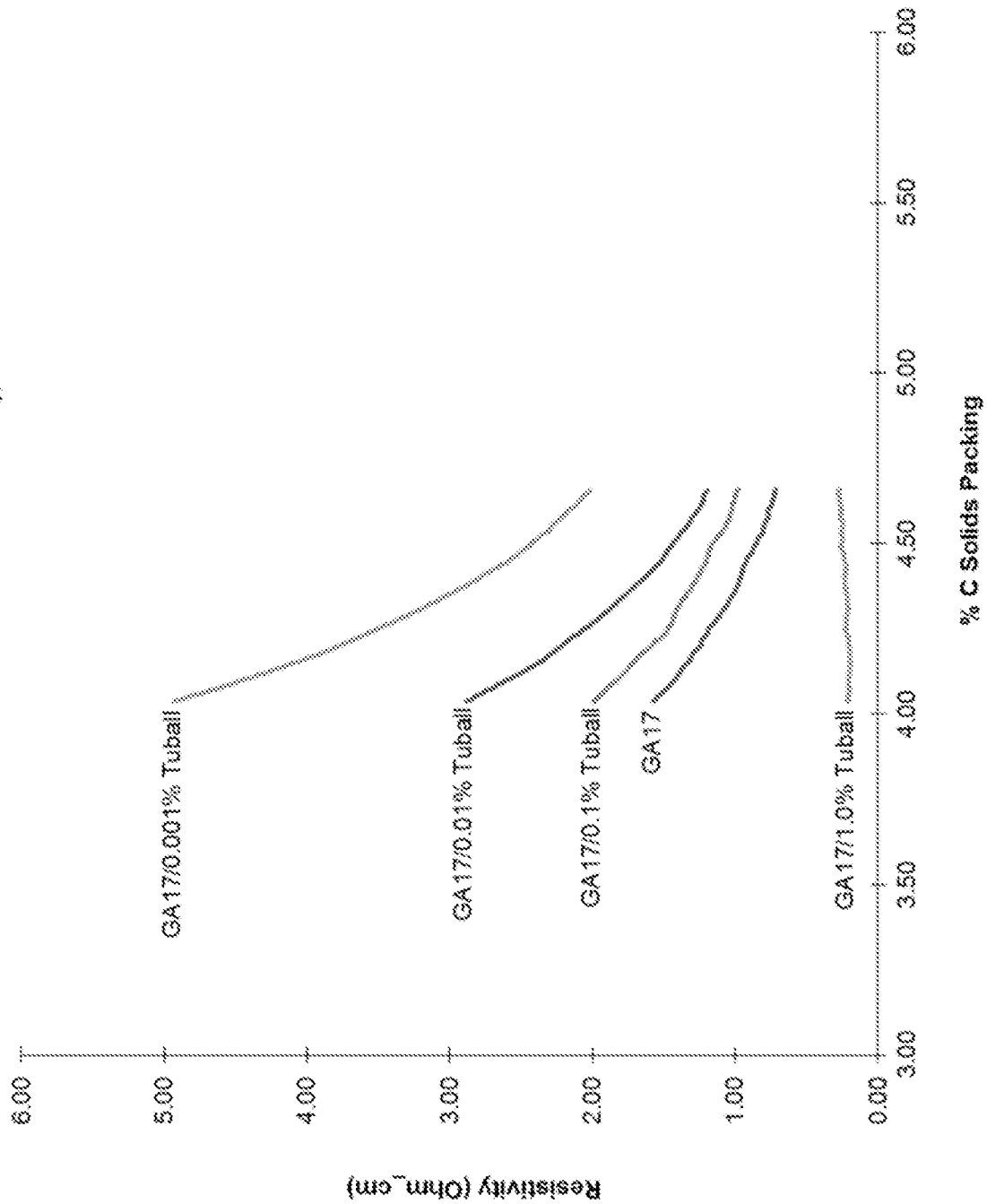
FIG. 8 shows resistivity vs. compaction data for five different 30:1 EMD/C mixes, having differing levels of SWCNTs.
Figure 9:
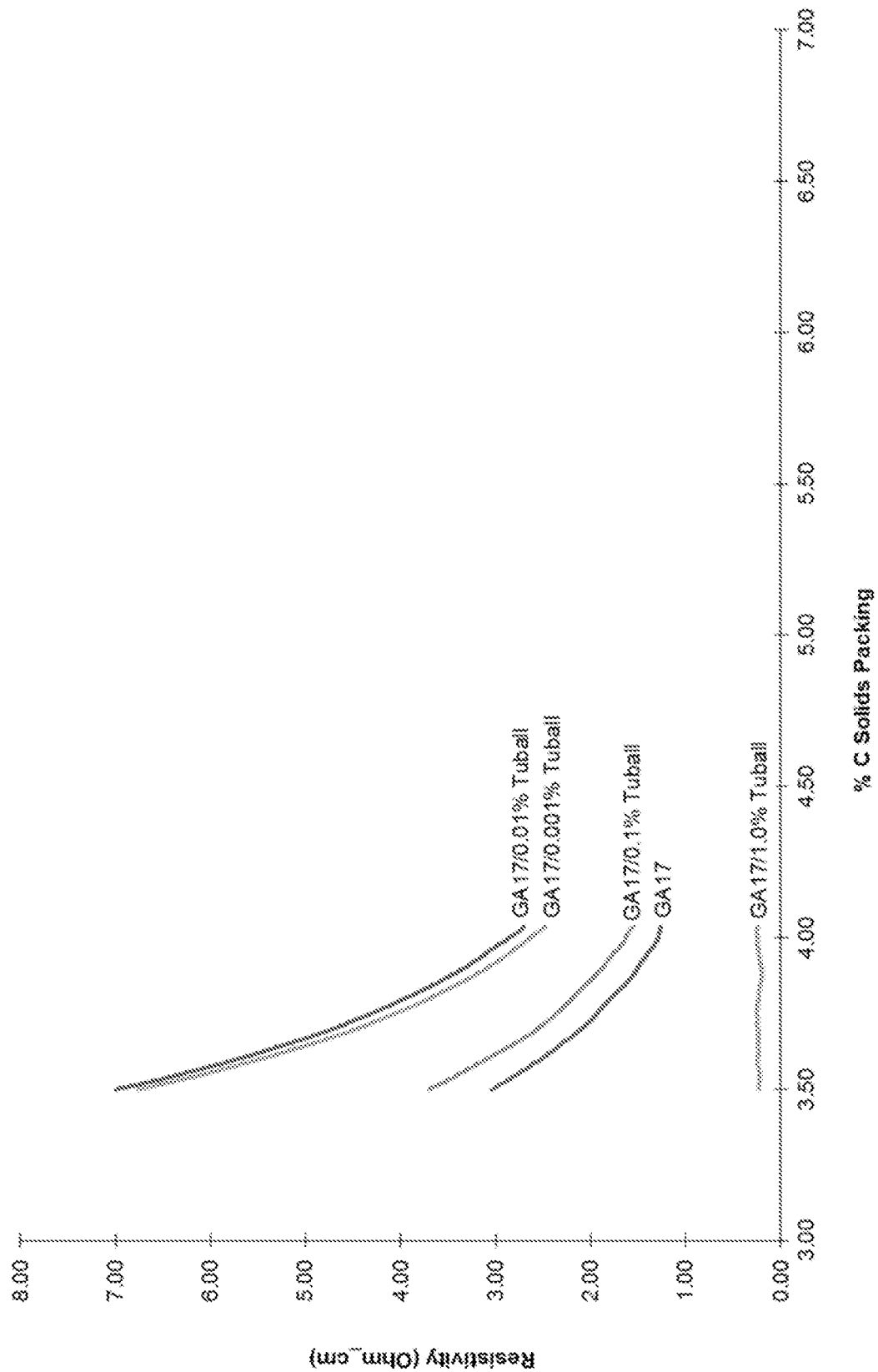
FIG. 9 shows resistivity vs. compaction data for five different 35:1 EMD/C mixes, having differing levels of SWCNTs.

The same series of tests, including the same varying levels of SWCNTs, was conducted for O:C ratios of 25:1 (FIG. 7), 30:1 (FIG. 8), and 35:1 (FIG. 9). All showed decreased resistivity for the pellet that was 1% SWCNT, compared to the pellet comprising carbon that was entirely expanded graphite.

Figure 10:
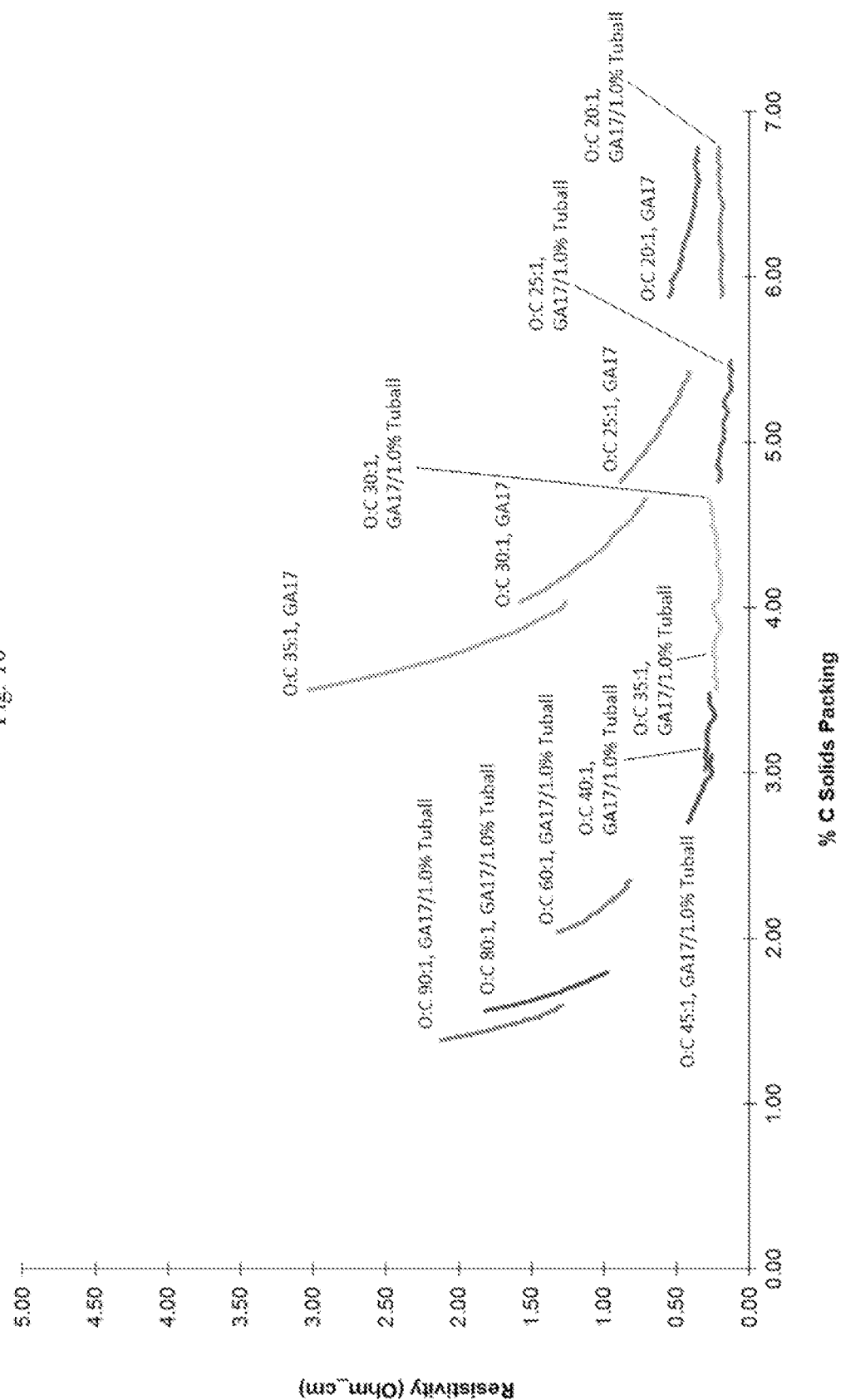
FIG. 10 shows resistivity vs. compaction data for different O:C ratios, some comprising expanded graphite only, and some having 1% of the expanded graphite replaced by SWCNTs.

FIG. 10 demonstrates differences in resistivity between pellets comprising pure expanded graphite and pellets comprising expanded graphite with 1% SWCNTs, across O:C ratios from 20:1 to 35:1, in the 65-75% packing range. It also shows data for pellets comprising expanded graphite with 1% SWCNTs for additional O:C ratios, ranging from 40:1 to 90:1. For the tested packing range, pellets having up to an O:C ratio of 45:1 demonstrated sufficiently low resistivity so as to be suitable for high drain applications. Higher O:C ratios may require further compression in order to be suitable.

The data were reviewed to determine the preferred options for EMD/C combinations. The criteria was to maximize EMD solids packing while maintaining conductivity. The preferred options are summarized in Table 1:

TABLE 1

Preferred options for EMD/C combinations

| O:C | Wt. % SWCNT | Resistivity (ohm-cm) | Molding force (ft 1b) {% of 20:1 force} | Final solids packing (vol. %) | Final EMD solids packing (vol. %) |
|---|---|---|---|---|---|
| 20:1 | 0 | 0.4 | 13510 | 74.2 | 67.2 |
| 25:1 | 0 | 0.4 | 14000 {103} | 74.5 | 67.5 |
| 40:1 | 1 | 0.2 | 16660 {123} | 71.2 | 67.6 |
| 45:1 | 1 | 0.3 | 16660 {123} | 70.9 | 67.7 |

Addition of SWCNTs enabled higher O:C ratios, leading to an up to 0.5% increase in EMD solids packing. However, the SWCNTs also increased molding forces and springback of pellets, which both affect the amount of EMD in the pellet and expected tooling life.

Figure 11:
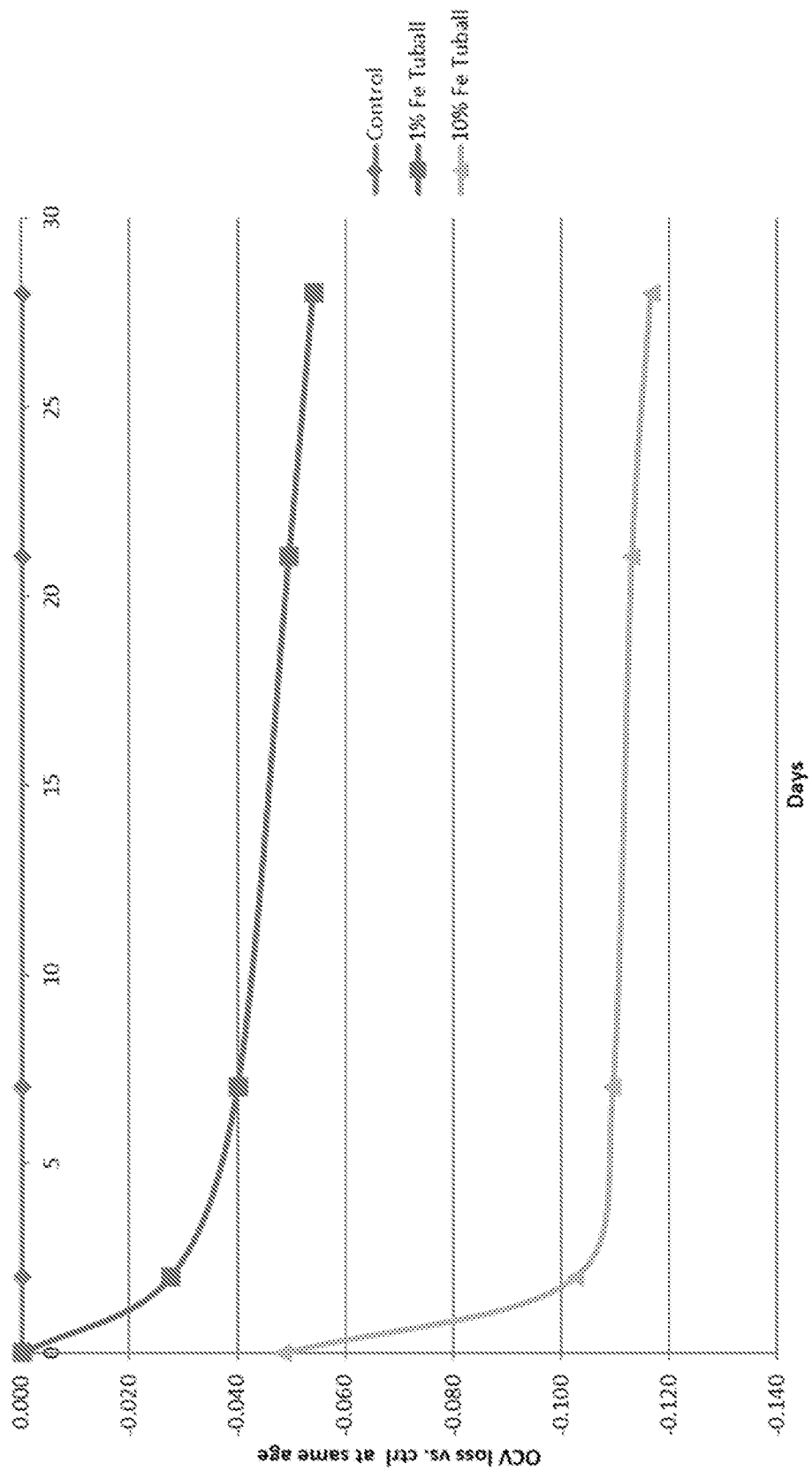
FIG. 11 demonstrates the stability of EMD/C mixtures having varying levels of Fe SWCNTs.

Stability tests of EMD/C mixtures were also conducted. Impurities in SWCNTs will reduce $MnO_2$, which negatively affects the stability of the mixture. Three mixtures of 30:1 ratio O:C were created. For their respective carbon components, one mixture comprised 1% Fe SWCNT in expanded graphite, another mixture comprised 10% Fe SWCNT in expanded graphite, and a control mixture comprised only expanded graphite. Their open-circuit voltage (OCV) was measured over a period of 28 days, and the OCV loss of the SWCNT/expanded graphite mixtures was compared to that of the control. The results are shown in FIG. 11. With 1% Fe SWCNT, a cathode OCV reduction of >40 mV is observed over 28 days.

Figure 12:
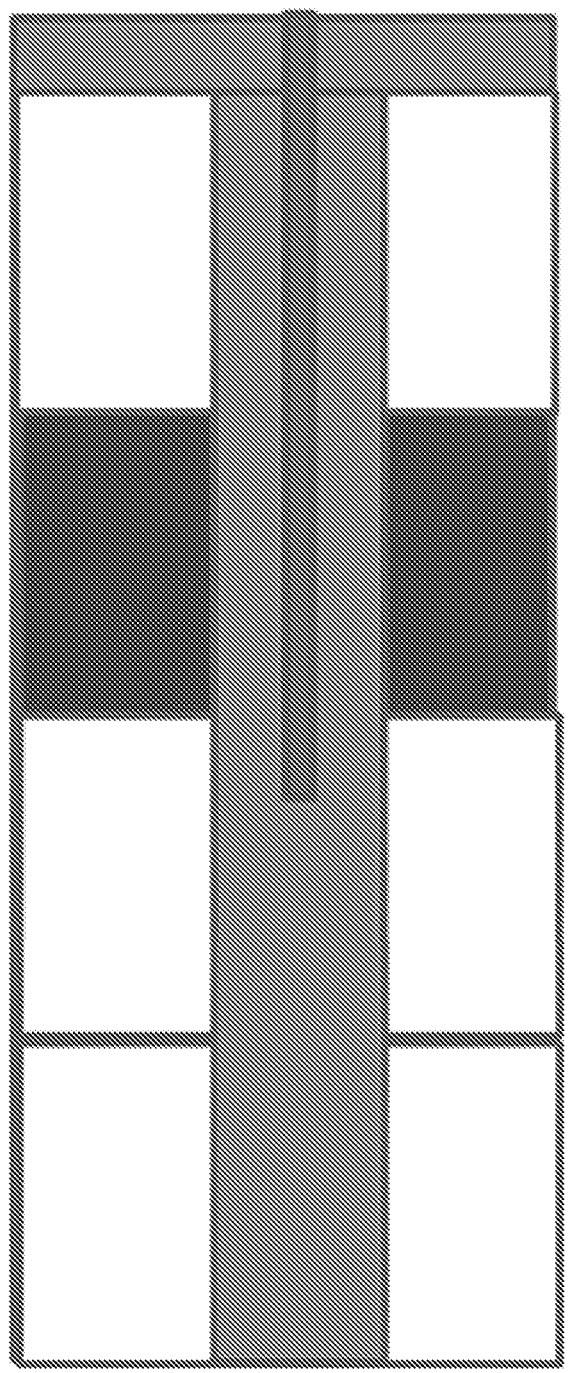
FIG. 12 is a schematic of the ¼ AA battery setup for an experiment.
Figure 13:
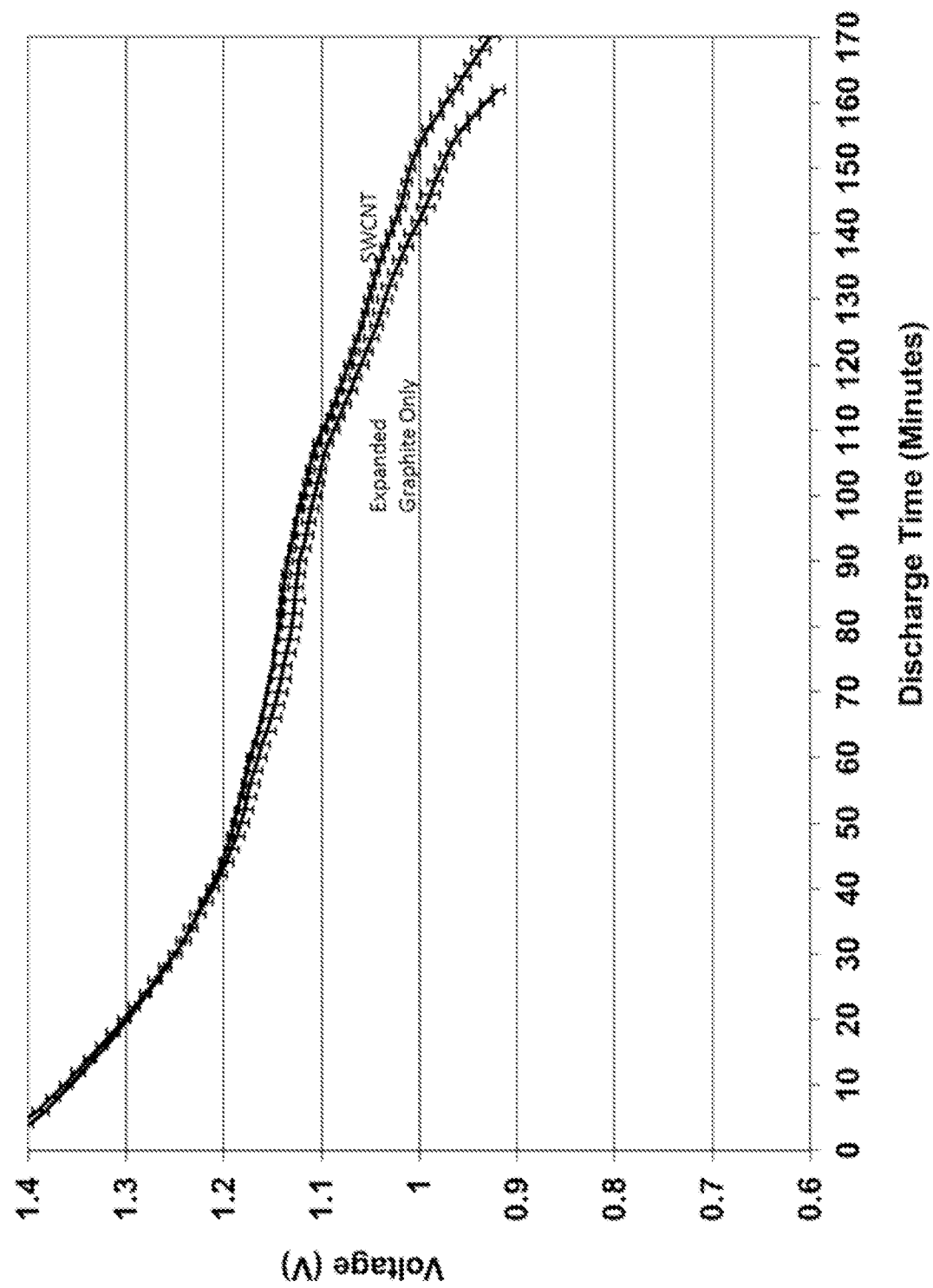
FIG. 13 shows the results of the ¼ AA battery setup for high drain characteristic comparisons between expanded graphite and an expanded graphite/SWCNT mixture.

Finally, a ¼ AA test was performed to compare low volume percent (2.2%) carbon in a mix to 4.8% volume percent with expanded graphite. This test uses a standard AA battery, prepared with four cathode rings. One of the rings in a standard battery (with the 4.8 volume percent expanded graphite) was replaced with a ring prepared using the low volume percent carbon (see FIG. 12 for a schematic of the experimental setup; the black ring is the substituted ring). The two batteries exhibited equivalent high rate service discharge (750 mA), as seen in FIG. 13.

Overall, it was found that the carbon level in a cathode mixture can be decreased from an O:C ratio of 22:1 (3.95 wt %) to 45:1 (2.17 wt %) when 1% SWCNTs were added to the mixture. It was also noted that SWCNTs have a higher springback than expanded graphite, following compression, resulting in an increase of 0.5% volume percent in EMD solids packing. This may be improved slightly by increasing molding forces and optimizing cell integration.

Many modifications and other embodiments will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims and list of embodiments disclosed herein. Although specific terms are employed herein, they are used in a generic and descriptive sense only and not for purposes of limitation. For the embodiments described in this application, each embodiment disclosed herein is contemplated as being applicable to each of the other disclosed embodiments. Further, the embodiments illustratively disclosed herein suitably may be practiced in the absence of any element which is not specifically disclosed herein.

What is claimed is:

1. An electrochemical cell comprising:
   i) an electrode comprising i) single-walled carbon nanotubes (SWCNTs), ii) an active material which is an oxide, and iii) graphite; wherein the electrode comprises SWCNTs in a concentration of about 1 wt % relative to the total mass of the active material and the graphite; and
   ii) an electrolyte solution which comprises potassium hydroxide (KOH), sodium hydroxide (NaOH), lithium hydroxide (LiOH), magnesium hydroxide ($Mg(OH)_2$), calcium hydroxide ($Ca(OH)_2$), magnesium perchlorate ($Mg(ClO_4)_2$), magnesium chloride ($MgCl_2$), or magnesium bromide ($MgBr_2$).

2. The electrochemical cell of claim 1, wherein the graphite is expanded graphite.

3. The electrochemical cell of claim 1, wherein the active material is manganese dioxide, a nickelate, nickel oxyhydroxide, or copper oxide.

4. The electrochemical cell of claim 1, wherein the electrode has an oxide to carbon (O:C) ratio of 10:1-90:1.

5. The electrochemical cell of claim 1, wherein the electrode comprises $MnO_2$ in the form of electrolytic manganese dioxide (EMD), chemical manganese dioxide (CMD), or natural manganese dioxide (NMD).

6. The electrochemical cell of claim 5, wherein the electrode comprises EMD.

7. The electrochemical cell of claim 1, wherein the electrode has a resistivity that is less than that of an electrode which has an identical O:C ratio, but does not comprise the SWCNTs.

8. The electrochemical cell of claim 7, wherein the resistivity is from 1% less to 90% less.

9. The electrochemical cell of claim 1, wherein the electrochemical cell is a primary cell.

10. The electrochemical cell of claim 1, wherein the electrochemical cell is a secondary cell.

11. The electrochemical cell of claim 1, comprising an anode having an active material selected from the group consisting of zinc, magnesium, aluminum and silicon.

12. The electrochemical cell of claim 1, wherein the cell operates at a voltage of 0.1 V-2.0 V.

13. The electrochemical cell of claim 1, wherein the electrochemical cell is an alkaline electrochemical cell.

14. An electrochemical cell comprising i) a cathode, said cathode comprising EMD, single-walled carbon nanotubes (SWCNTs), and expanded graphite, and said cathode having an oxide to carbon (O:C) ratio of 20:1-60:1, wherein the cathode comprises SWCNTs in a concentration of about 1 wt % relative to the total mass of the EMD and the expanded graphite; and ii) an electrolyte solution which comprises potassium hydroxide (KOH), sodium hydroxide (NaOH), lithium hydroxide (LiOH), magnesium hydroxide ($Mg(OH)_2$), calcium hydroxide ($Ca(OH)_2$), magnesium perchlorate ($Mg(ClO_4)_2$), magnesium chloride ($MgCl_2$), or magnesium bromide ($MgBr_2$).

* * * * *